United States Patent [19]

Terhune

[11] Patent Number: 5,444,747
[45] Date of Patent: Aug. 22, 1995

[54] JET PUMP ELECTRO-NOZZLE

[75] Inventor: James H. Terhune, San Jose, Calif.

[73] Assignee: General Electric Company, Schenectady, N.Y.

[21] Appl. No.: 239,773

[22] Filed: May 9, 1994

[51] Int. Cl.6 .................. G21C 15/00; G21C 19/28
[52] U.S. Cl. .................. 376/372; 376/260; 376/210; 376/259; 376/305
[58] Field of Search .............. 376/372, 260, 210, 259, 376/305; 338/61; 205/83, 125; 324/327, 464

[56] References Cited

U.S. PATENT DOCUMENTS

| | | | |
|---|---|---|---|
| 3,625,820 | 12/1971 | Glunte | 376/372 |
| 3,815,038 | 6/1974 | Davis | 330/30 D |
| 4,048,558 | 9/1977 | Goodman | 324/57 R |
| 4,117,396 | 9/1978 | Berkey et al. | 324/33 |
| 5,101,159 | 3/1992 | Bossard et al. | 324/456 |
| 5,122,330 | 6/1992 | Solomon et al. | 376/245 |
| 5,171,517 | 12/1992 | Solomon et al. | 376/245 |

Primary Examiner—Donald P. Walsh
Assistant Examiner—Meena Chelliah
Attorney, Agent, or Firm—James E. McGinness

[57] ABSTRACT

A method and a device for minimizing electrostatically enhanced deposition of charged particulates in the jet pump nozzles of operating BWR plants. The jet pump nozzle has an inner conducting surface which is electrically isolated from the main body of the nozzle. An electrical circuit is electrically coupled to the inner conducting surface of the nozzle. The electrical circuit is designed to electrically minimize charged-particle deposition at the nozzle surface exposed to a free-stream electrical potential, using a DC circuit with active element feedback to adjust the surface potential to minimize the net current to the inner conducting surface, thereby minimizing deposition.

21 Claims, 7 Drawing Sheets

JET PUMP ELECTRO-NOZZLE

FIELD OF THE INVENTION

This invention generally relates to the phenomenon wherein "crud" layers form on inner surfaces of components in boiling water reactors (BWRs). In particular, the invention concerns electrostatically enhanced deposition of charged particulates in the convergent nozzles of jet pumps used in BWRs.

BACKGROUND OF THE INVENTION

In a conventional BWR, the core of nuclear fuel is cooled by water. Feedwater is admitted into a reactor pressure vessel (RPV) via a feedwater inlet and a feedwater sparger, which is a ring-shaped pipe having suitable apertures for circumferentially distributing the feedwater inside the RPV. The feedwater flows downwardly through the downcomer annulus, which is an annular region between the RPV 10 and the core shroud 18, which is a stainless steel cylinder surrounding the nuclear fuel core. Water from the downcomer annulus flows radially inwardly to the core lower plenum and then upwardly through the fuel core. A mixture of water and steam flows through standpipes and enters steam separators. The separated liquid water then mixes with feedwater, which mixture then returns to the core via the downcomer annulus.

The BWR also includes a coolant recirculation system which provides the forced convection flow through the core necessary to attain the required power density. A portion of the water is sucked from the lower end of the downcomer annulus via a recirculation water outlet and forced by a centrifugal recirculation pump into jet pump assemblies via recirculation water inlets. The BWR has two recirculation pumps, each of which provides the driving flow for a plurality of jet pump assemblies.

A conventional jet pump assembly comprises an inlet mixer 10 (see FIG. 1A) which receives pressurized driving water via an inlet riser (not shown) and an elbow 14 in flow sequence. A typical BWR has 16 to 24 inlet mixers. In flow sequence starting from the outlet of elbow 12, the inlet mixer comprises: a pre-nozzle section 14; a nozzle section including five nozzles 16 circumferentially distributed at equal angles about the inlet mixer axis; a throat section 18; a barrel section 20; a flare section 22; and a slip joint 24. Each nozzle 16 is tapered radially inwardly at its outlet, so that the nozzle has a maximum diameter $d_1$ and an exit diameter $d_2$ which is less than $d_1$ (see FIG. 1B). The jet pump is energized by this convergent nozzle.

Five secondary inlet openings 26 are circumferentially distributed at equal intervals about the inlet mixer axis. These secondary inlet openings are situated radially outside of the nozzle exits. Therefore, as jets of water exit the nozzles 16, water from the downcomer annulus (not shown) is drawn into the inlet mixer 10 via the secondary inlet openings 26, where it is mixed with water from the recirculation pump (not shown).

Experience has shown that a slow build-up of a "crud" layer on the inner surface of nozzles occurs which gradually degrades their performance. Eventually, this degradation requires that the nozzles be mechanically cleaned, or in extreme cases replaced, which is an expensive and time-consuming operation during plant refueling outages. The build-up of "crud" in jet pumps has been observed in regions of highest flow velocity, caused by the induced electrostatic charge on the metallic inner surface interacting with charged particles suspended in the water. Heaviest deposits have been reported on the inner surfaces of the jet pump throat and nozzle, whereas few, if any, deposits are observed on the diffuser and elbow surfaces. If suspended particulates acquire both positive and negative electrical charges, as they are transported about the BWR, then an electrostatic interaction with the metallic surface can occur. The electrostatic field very close to the surface enhances deposition of particulates carrying charge opposite in sign to the surface charge induced in the metal. This, of course, is also a function of the turbulent bulk-fluid flow and the fluid boundary layer very close to the surface (the laminar sublayer). The fact that deposits build up preferentially in regions of highest bulk-flow velocity can be shown to be a result of higher flows possessing thinner boundary layers, which also effects enhanced deposition.

An extensive analysis of this phenomenon has been performed to elucidate the mechanisms controlling electrostatic deposition of charged particulates in the presence of a laminar fluid sublayer. The idealized physical picture is shown in FIG. 2, where $V(x)$ is the fluid velocity boundary layer and $\phi(y)$ is the electrostatic boundary layer. An approximate solution of the two-dimensional Navier-Stokes equations for the boundary layer in a convergent nozzle has been obtained to describe the fluid field. The electrostatic field equation is formulated assuming the presence of a volumetric charge density in the fluid, due to the presence of positive- and negative-carriers (or particulates of differing properties and charges). These equations are coupled through the continuity equations for the carrier densities. The resulting set is a ninth-order, nonlinear, two-dimensional set of simultaneous partial differential equations and their boundary conditions. Steady-state conditions are assumed in the approximate solution of this set of equations.

It is found that the electrostatic field possesses a characteristic length $\lambda_D$ which is inversely proportional to the square root of the free-stream particulate density. The fluid field characteristic length is the mean boundary layer thickness $\delta$ which is inversely proportional to the square root of the Reynolds number Re. The charged-particle density scales as the ratio of these characteristic lengths $\delta/\lambda_D$, which is proportional to the reciprocal of the product $Re^{\frac{1}{2}}\lambda_D$.

It happens that the character of the solution for the surface flux $\Gamma_-$ changes when $\delta/\lambda_D \approx 2$, manifested as a threshold for electrostatically enhanced particulate deposition. This means that as the flow increases in convergent nozzles, $\delta/\lambda_D$ decreases to the point of deposition threshold. Thereafter, the surface flux is enhanced by the electrostatic forces, resulting in more particulates of higher energy impinging the surface. The resulting "crud layer" on the nozzle surface is tightly adhered, although some erosion by fluid friction can remove the more loosely bound outer portions.

A detailed analysis of the many variables and their interrelations leads to a means of mitigating electrodeposition, so that a nozzle can be designed to operate outside the regime of strong deposition. In order to better understand the instant invention, it is well to summarize the main points of the complicated, lengthy analysis.

A mathematical model of the nozzle depicted in FIG. 2 allows the actual geometry to be reduced to an equivalent one, in which the rate-of-change of velocity with distance along the surface is constant, thereby affording considerable analytical simplification. The free-stream fluid mechanics is described by the Bernoulli equation, in the form:

$$-\frac{1}{\rho} \frac{\partial p}{\partial x} = V(x) \frac{\partial V(x)}{\partial x}$$

This pressure drop is due to acceleration alone, neglecting the relatively small inlet and outlet losses and viscous dissipation in the bulk fluid. The assumption is that this pressure drop is the same everywhere in the fluid, including the boundary layer close to the nozzle surface. In addition, the fluid density $\rho$ is taken to be constant throughout. The bulk fluid velocity $V(x)$ is essentially one-dimensional, but the fluid motion in the boundary layer is two-dimensional. Since the boundary layer is thin compared to the nozzle dimensions, curvature effects are negligible. Using the Bernoulli equation for axial pressure drop and neglecting vertical viscous forces, the continuity and momentum equations in x,y coordinates become:

$$\frac{\partial v_x}{\partial x} + \frac{\partial v_y}{\partial y} = 0;$$

$$v_x \frac{\partial v_x}{\partial x} + v_y \frac{\partial v_x}{\partial y} = V(x) \frac{\partial V}{\partial x} + \nu \frac{\partial^2 v_x}{\partial y^2}$$

respectively, where $v_x$ and $v_y$ are the components of the velocity field in the boundary layer defining the stream-function $\psi$ as:

$$\psi = \sqrt{V(x)\nu x} \; f(\eta)$$

and applying the similarity transformation:

$$\eta = \frac{y}{x} \sqrt{Re_x} \; ; \; Re_x \equiv \frac{V(x)x}{\nu}$$

where the lineal Reynolds number $Re_x$ is defined with respect to free-stream velocity and distance x along the nozzle. Since the flow in the nozzle accelerates with approximately linear axial dependence and the axial rate-of-change of velocity is assumed constant, the pressure gradient is proportional to $V(x)$, which is approximately linear.

The velocity components are given in terms of the similarity variable as:

$$v_x = \frac{\partial \psi}{\partial y} = \frac{\eta}{y} \sqrt{V(x)\nu x} \; \frac{\partial}{\partial \eta} f(\eta) = V(x) f'$$

$$v_y = -\frac{\partial \psi}{\partial x} = -\frac{\partial}{\partial x} \sqrt{V(x)\nu x} \; f(\eta) =$$

$$\gamma \frac{\sqrt{\nu V(x)x}}{2x} (\eta f' - f)$$

where the parameter $\gamma$ is nearly constant:

$$\gamma \equiv \left[1 - \frac{x}{V(x)} \frac{\partial V}{\partial x}\right]$$

The bulk velocity increases with x, so the ratio $x/V(x)$ is slowly varying over most of the nozzle length beyond the inlet zone—an important consequence of the simplified nozzle model.

The continuity equation is satisfied identically by the similarity transformation, and after some algebraic manipulation, the momentum equation becomes:

$$(\gamma - 1)(1 - f')f' + \frac{\gamma}{2} (f - \eta f')f'' + f''' = 0$$

(The primes indicate differentiation with respect to $\eta$.) This equation is a generalization of the Blasius equation for uniform flow over a flat plate with non-zero pressure gradient (i.e., $y=1$). Strictly speaking, the accelerated flow field does not conform to a similarity law, but in slowly convergent nozzles, this pseudo-similarity transformation can be applied.

The boundary conditions on $v_x$ and $v_y$ are:

$$v_y(0,x) = \frac{\gamma}{2} \sqrt{\frac{\nu V(x)}{x}} \; (\eta f' - f)_{\eta=0} = 0$$

$$v_x(0,x) = V(x) (f')_{\eta=0} = 0$$

$$v_x(y,0) = V_0(f')_{\eta=\infty} = V_0$$

which transform to:

$$f(0)=f'(0)=0; \; f'(\infty)=1$$

The solution for the boundary layer is computed by numerically integrating the nonlinear differential equation for $f(\eta)$. The result is then used to compute the velocity distribution in the boundary layer. The tangential component is much larger than the normal component of velocity, therefore only the tangential velocity distribution need be considered further. This is shown in FIG. 3 for a typical case.

The boundary layer narrows as the flow accelerates in the convergent section of the nozzle, as seen from the shape of the fluid velocity distribution. The boundary layer thickness $\delta 0$ is defined to be the value of y corresponding to 99% of the free-stream velocity at any particular tangential position (x-value). $\delta(x)$ is computed iteratively from the velocity field solution, with the result shown in FIG. 4 for a typical case (L=11.8 in.). The mean value of the curve in FIG. 4 is what enters into the subsequent description.

In the free stream of the fluid there are suspended at least two species of charged particles one carrying charge $q_+$ and the other carrying charge $q_-$, with respective densities $n_+$ and $n_-$. The various species are in thermal equilibrium with the fluid; therefore, each possesses a Maxwellian velocity distribution that corresponds to the fluid temperature T (°K.). If the dielectric constant of the fluid is K, the Gauss law for the electrostatic field intensity E, or the reduced potential $\Phi$, can be written as:

$$\nabla^2 \Phi = \left( \frac{n_0(x) \, q_0^2}{K\epsilon_0 kT} \right) \left[ \alpha \frac{n_-}{n_0(x)} - \beta e^{-\beta \Phi} \right]$$

where $\epsilon_0$ ($8.855 \times 10^{-12}$ farad/m) is the permittivity of vacuum and k ($0.8617 \times 10^{-4}$ eV/°K.) is the Boltzmann constant. Here, the following definitions are used:

$$\Phi \equiv \frac{\phi q_0}{kT} \; ; \; n_+ = n_0(x) \, e^{-\frac{\phi q_+}{kT}}$$

$$\alpha \equiv \frac{q_-}{q_0} \; ; \; \beta \equiv \frac{q_+}{q_0} \; ; \; q_0 \equiv q_+ + q_-$$

The charged-particle densities are each functions of position, but the charges they carry are assumed to be constant (radiation field effects are negligible in jet pump locations). Each specie possesses a mobility in the fluid ($\mu_+$ or $\mu_-$), which are numerically different.

The variation of $n_0$ with x is due to convergence of the flow that carries the species in the bulk fluid. Continuity requires:

$$n_0(x) = \frac{N_0 V_0}{V(x)}$$

where $N_0 V_0$ is the free-stream inlet flux density. Then defining the pseudo-constant $\chi$ by:

$$N \approx 0.93 \left( \frac{\lambda_D}{\delta} \right)^2$$

and transforming to the $\eta$-variable yields:

$$N \frac{\partial^2}{\partial \eta^2} [\Phi(\eta) - \Phi_\infty] + e^{-\beta[\Phi(\eta) - \Phi_\infty]} = \frac{n_-(\eta)}{n_\infty}$$

$$e^{\beta \Phi_\infty} \equiv \frac{\beta}{\alpha} \; ; \; \lambda_D^{-2} \equiv \left( \frac{\alpha N_0 q_0^2}{K \epsilon_0 kT} \right)$$

The boundary conditions on $\Phi$ are:

$$\frac{q_0}{kT} E(y=0) = -\left. \frac{\partial \Phi}{\partial y} \right|_{y=0} = \frac{q_0 \sigma}{K \epsilon_0 kT} \; ; \; \lim_{y \to \infty} \frac{\partial \Phi}{\partial y} \to 0$$

which transform to:

$$\left. \frac{\partial [\Phi(\eta) - \Phi_\infty]}{\partial \eta} \right|_{y=0} = -\frac{L q_0 \sigma}{\sqrt{Re_L} \, K\epsilon_0 kT} \; ;$$

$$\lim_{n \to \infty} \frac{\partial [\Phi(\eta) - \Phi_\infty]}{\partial \eta} \to 0$$

The quantity $\sigma$ is the induced surface charge density, and $Re_L$ is defined as $Re_x[L]$.

The nonlinear differential equation for $\Phi(\eta)$ is inhomogeneous, with $n_-(\eta)$ acting like a driving function. To determine $n_-(\eta)$, we apply a continuity equation to the particle flux $\Gamma_-$ of negative-carriers, and perform some mathematical manipulations to obtain:

$$\xi'' - \frac{\alpha}{N} \left( \xi^2 - \xi \frac{\beta}{\alpha} e^{-\beta \Phi} \right) + (S_c \eta f(\eta) - \alpha \Phi') \xi' = 0$$

$$\xi(\eta) \equiv \left( \frac{n_-}{n_\infty} \right); \; n_\infty \equiv n_-(\eta = \infty)$$

$$\xi(\eta = \infty) = 1; \; \xi'(\eta = \infty) = 0$$

where:

$$\nabla \cdot \Gamma_- = -D_- \nabla^2 n_- + \nabla \cdot (n_- v) = 0$$

$$D_- \equiv \frac{kT \mu_-}{q_-}$$

$$v = \bar{v} - \mu_- E \approx \frac{x}{x} v_x + \mu_- \nabla \phi$$

Since $f(\eta)$ is known for the nozzle boundary layer, the coupled $\zeta$-equation and $\Phi$-equation can be solved numerically and their boundary conditions satisfied. Then, the surface flux $\Gamma_S$ can be calculated from these numerical solutions. The results are shown in FIGS. 5-7.

The symbol in FIG. 7 denotes a typical case for jet pump nozzles. This function exhibits a threshold at $\delta / \lambda_D \approx 2.15$, implying that there exists a critical value of the mean boundary layer thickness for which strong deposition can occur.

The normalized electric field, due to the space-charge distribution near the metallic surface, is shown in FIG. 8 for a typical case involving enhanced mass transfer. Although the surface potential is typically a few tens of millivolts, the electric field intensity at the surface $E_0$ can be quite large, since the length scale is on the order of $\lambda_D$, a very small distance ($\sim 1$ $\mu$in.) on the order of the fluid boundary layer thickness.

SUMMARY OF THE INVENTION

The present invention addresses the problem of electrostatically enhanced deposition of charged particulates in the jet pump nozzles of operating BWR plants by providing a new nozzle design possessing physical means for automatically mitigating "crud" deposition. This novel nozzle is foreseen as a direct replacement for existing nozzles in jet pumps and could be retro-fitted without replacing the entire jet pump assembly. The result is that jet pump performance is not as sensitive to the details of the water chemistry flowing through it and does not degrade as much, or as rapidly, as is presently the case. The device is expected to be especially useful in operating plants where the water chemistry in vessels and piping can be variable, unpredictable and plant-specific. The impact on jet pump performance enhancement could be substantial.

The jet pump nozzle design in accordance with the present invention comprises means for electrically minimizing charged-particle deposition at the nozzle surface exposed to a free-stream electrical potential. The invention utilizes a DC circuit with active element feedback to adjust the surface potential to minimize the current to the inner surface, thereby minimizing deposition. Using the invention, "crud" build-up is minimized automatically and independently of the details of the water chemistry. The invention utilizes a unique nozzle configuration that is specific to the minimization of electrostatically enhanced deposition. Also, the invention provides means for essentially eliminating undesirable deposition without impacting the design performance of the jet pump containing the nozzle. Lastly, the unique nozzle design of the invention can be retro-fitted into existing jet pumps as a field replacement, with minimal time and cost, thereby reducing future maintenance and repair costs in operating BWR plants.

DETAILED DESCRIPTION OF THE PREFERRED EMBODIMENTS

The electrostatic field inside a jet pump nozzle arises from the induced surface charge on the metallic surface of the nozzle, which is normally at ground potential electrically. The presence of the charged particulates places the fluid at some other potential, either positive or negative with respect to ground, depending on the nature of the volumetric charge distribution. The space-charge "sheath" near the metal surface is a consequence of this potential difference, which is typically quite small ($\sim 0.1$ volt).

If, however, the nozzle body were at the same potential as the fluid, there would be no space-charge zone, and the net current to the surface would be zero. This is the "floating potential" of the metallic surface in contact with the slightly conducting fluid. In principle, the nozzle could be isolated from ground, so as to "float" electrically and receive no charged carriers that eventually build up deposits. But to do this requires that the charged carriers deposit their charge (or lack thereof) at the surface, which must then be dissipated immediately. Since the carriers do not necessarily have the same mobility or carry identical numbers of charges, there is no guarantee that this detailed balance will simply occur, especially in a BWR environment.

Figure 1A:
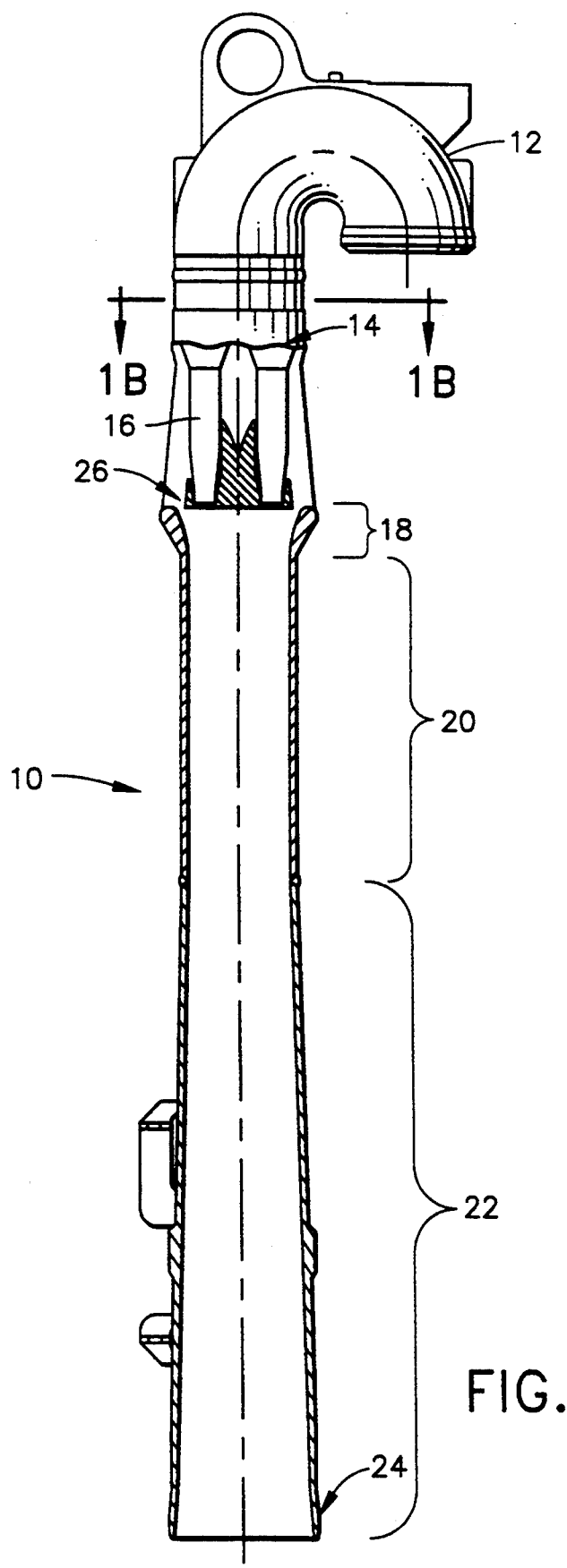
FIG. 1A is a partial sectional view of a conventional inlet mixer of a BWR jet pump assembly.
Figure 1B:
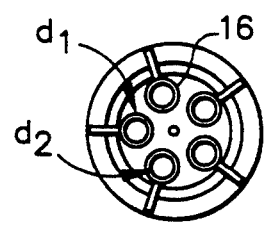
FIG. 1B is a sectional view of the inlet mixer of FIG. 1A taken along section line 1B—1B.
Figure 2:
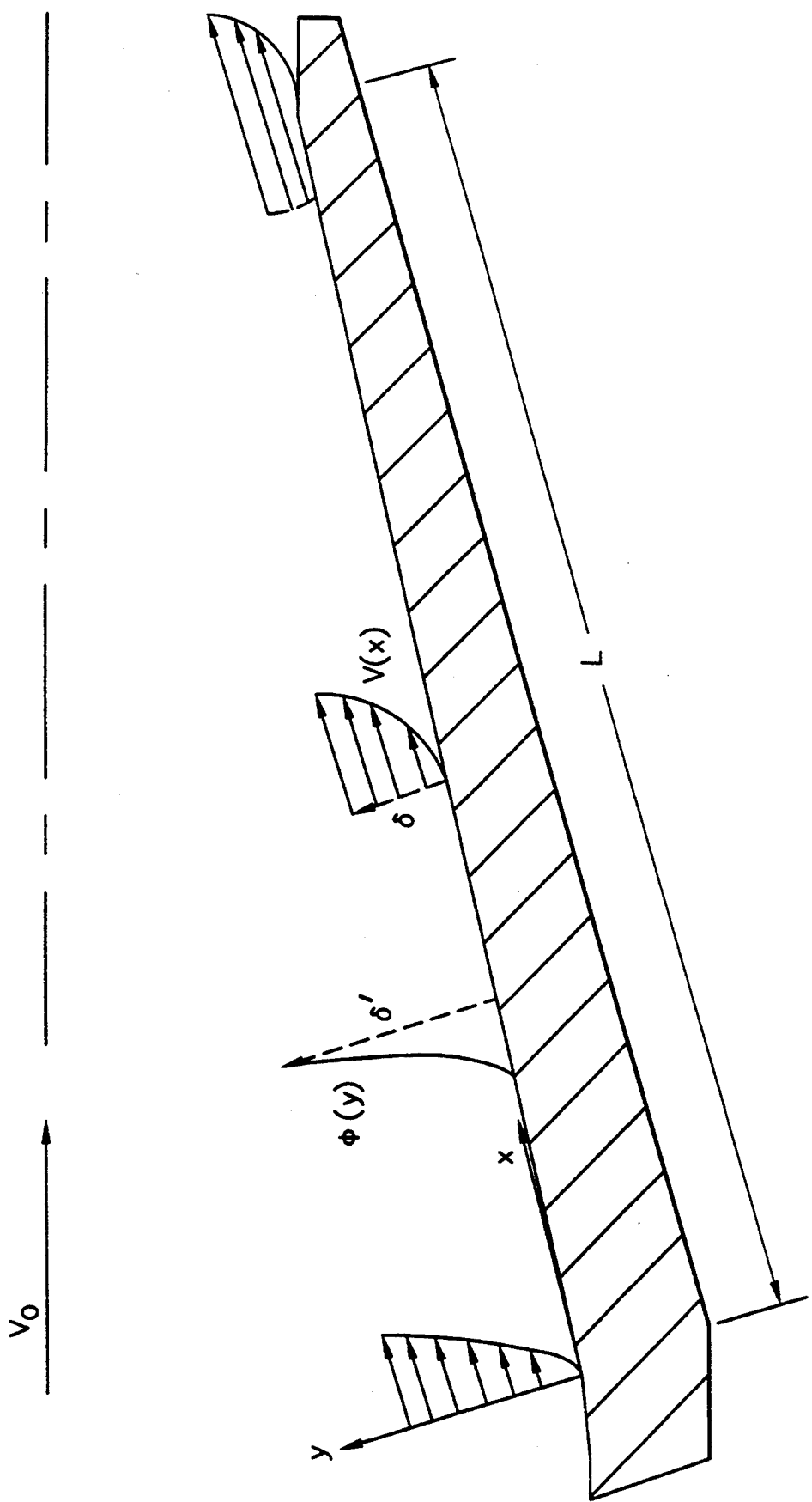
FIG. 2 is a schematic showing a section of the nozzle in a conventional inlet mixer.
Figure 3:
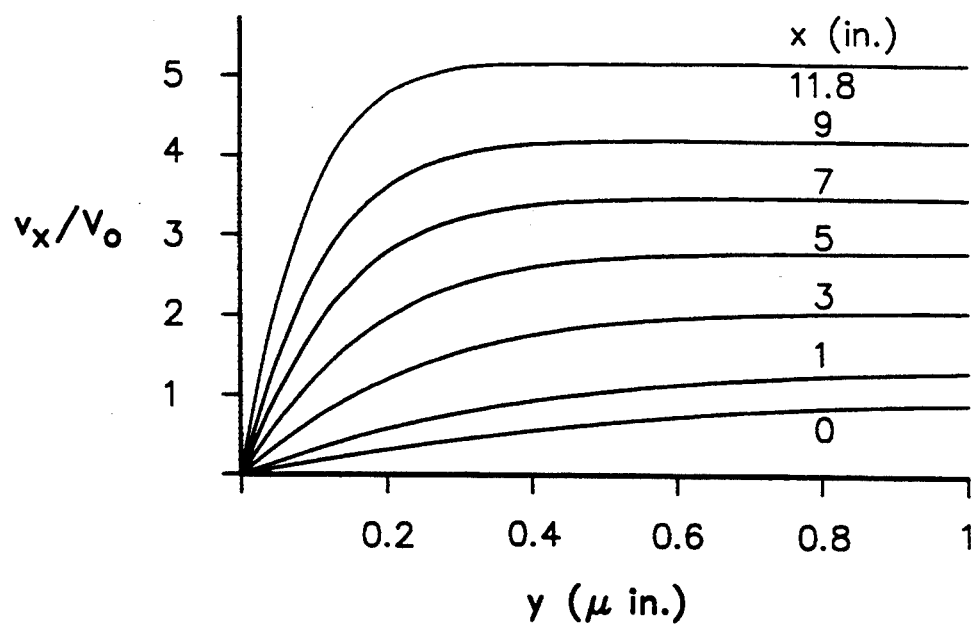
FIG. 3 is a plot of the normalized axial velocity distribution in the nozzle boundary layer.
Figure 4:
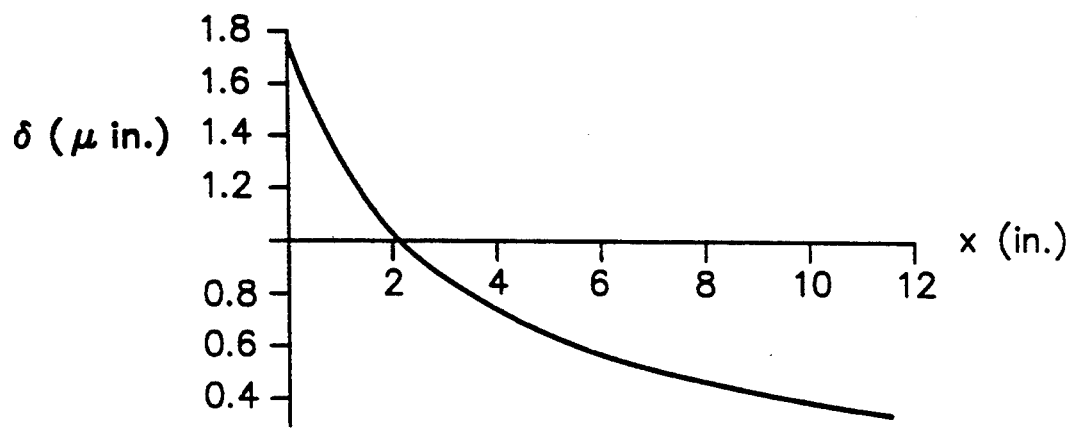
FIG. 4 is a plot of the nozzle boundary layer thickness variation as a function of tangential position.
Figure 5:
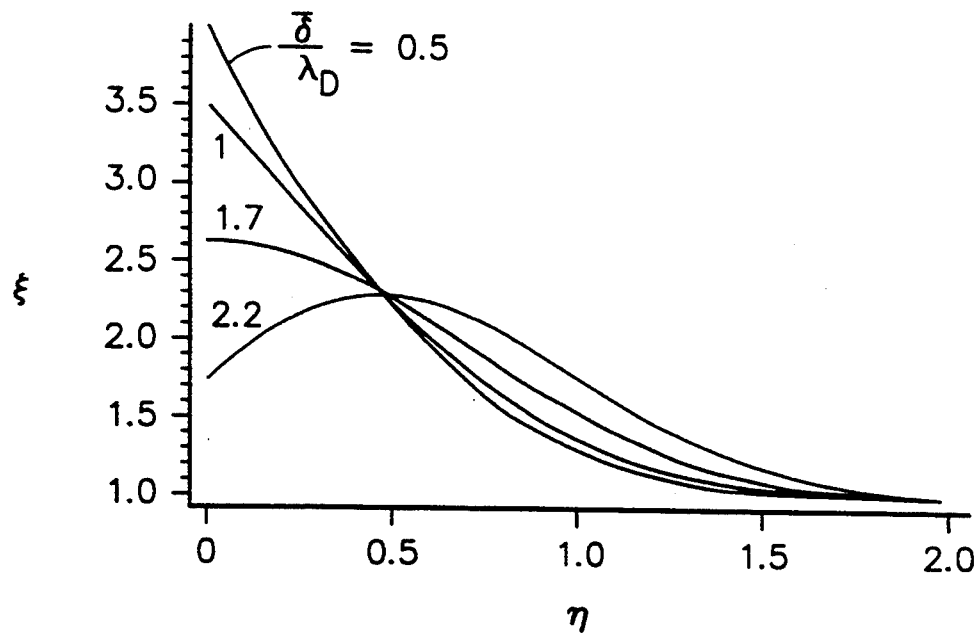
FIG. 5 is a plot of the numerical solution of the $\zeta$-equation as a function of $\delta/\lambda_D$.
Figure 6:
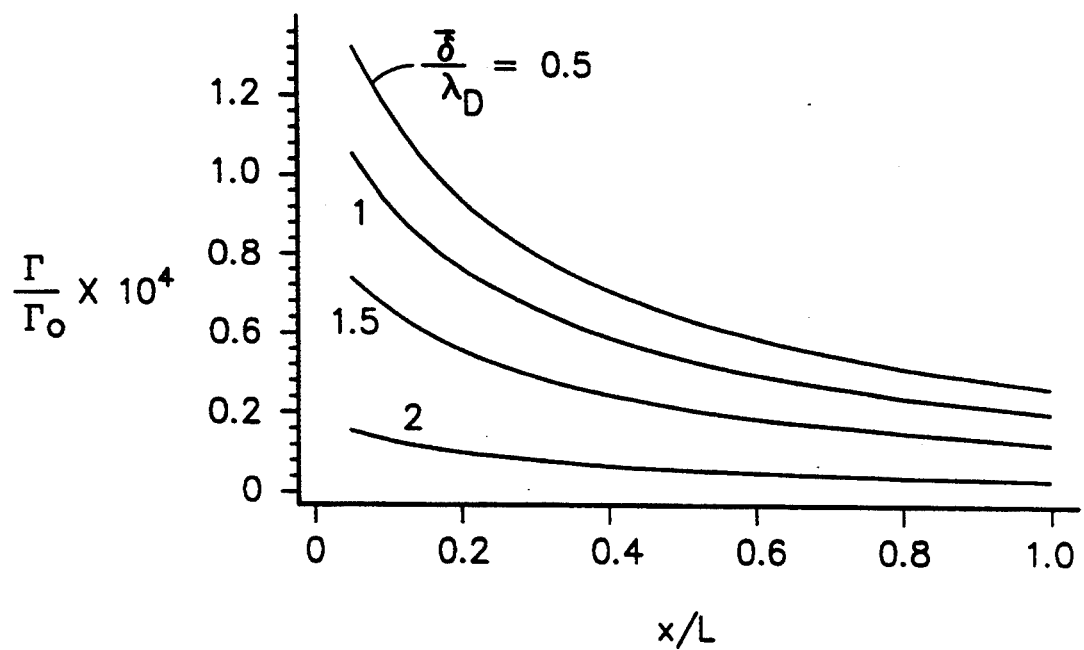
FIG. 6 is a plot of the normalized surface flux variation as a function of $\delta/\lambda_D$ and tangential position.
Figure 7:
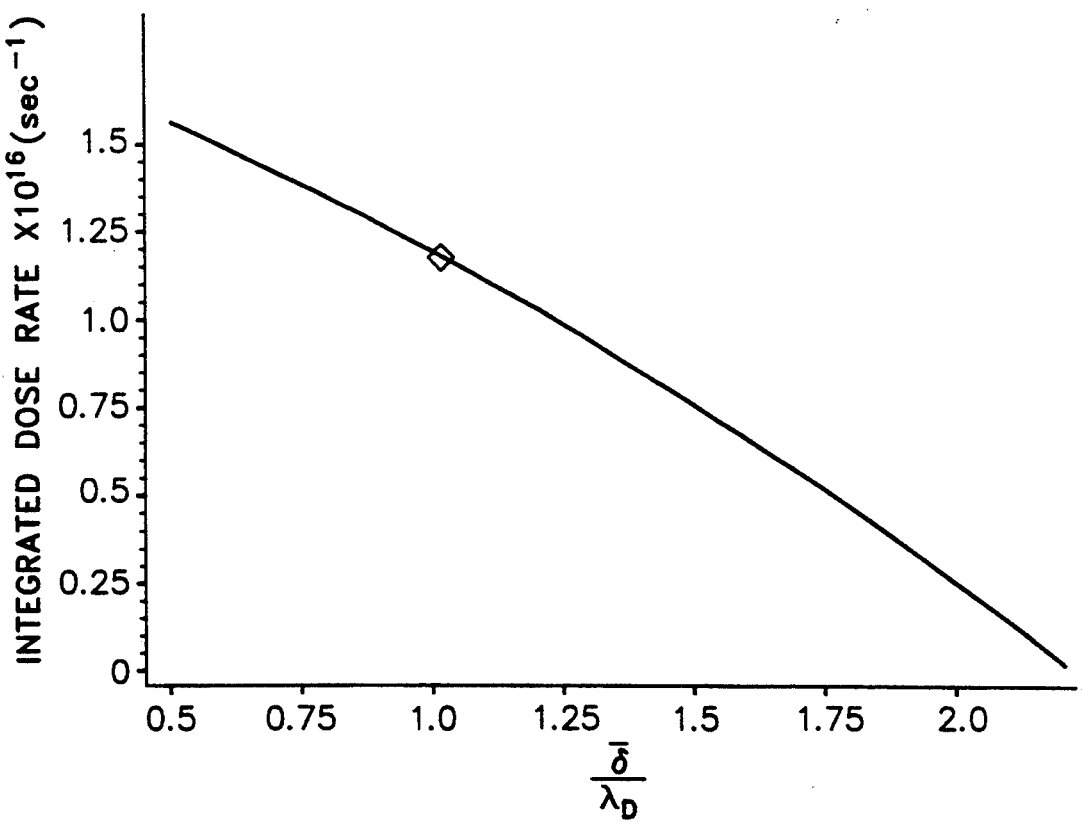
FIG. 7 is a plot showing the integrated deposition rate dependence on $\delta/\lambda_D$.
Figure 8:
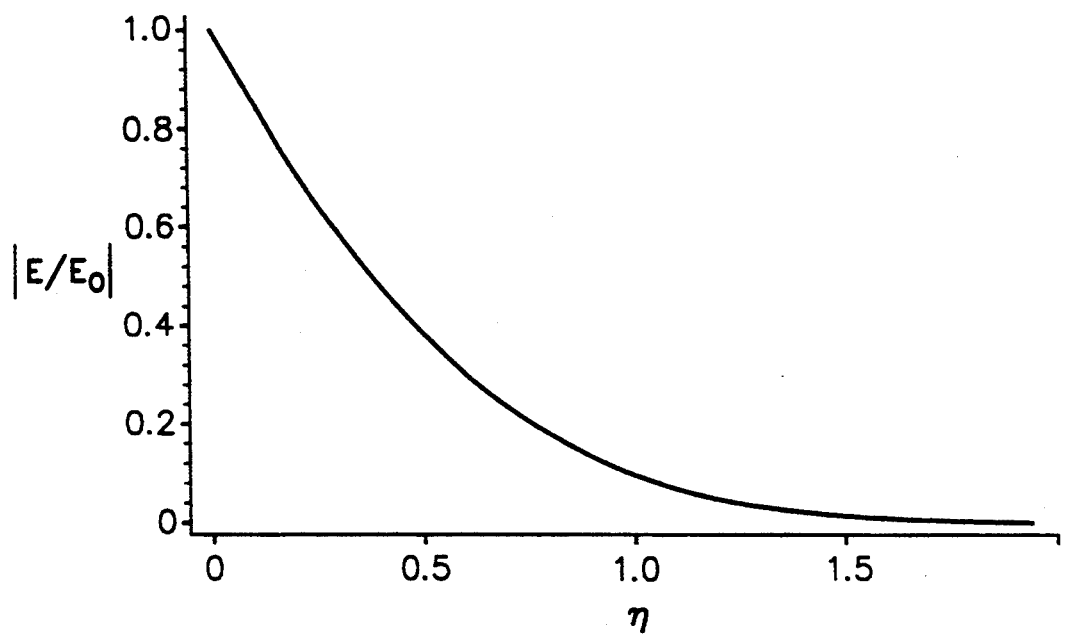
FIG. 8 is a plot showing the normalized electrostatic field intensity distribution for $\delta/\lambda_D \approx 1$.
Figure 9:
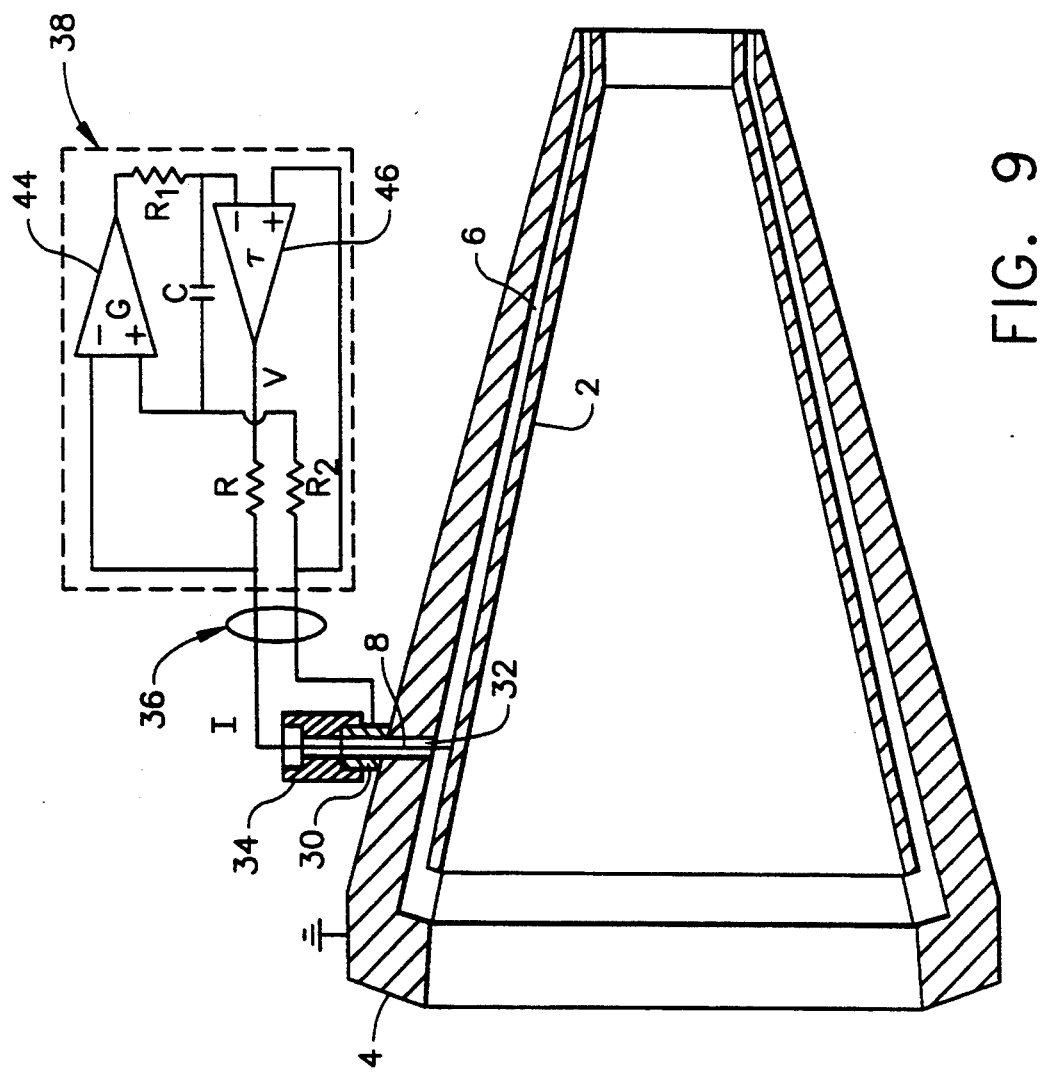
FIG. 9 is a schematic showing the jet pump electro-nozzle in accordance with the preferred embodiment of the invention with the nozzle body depicted in section at an exaggerated angle for ease of understanding.
Figure 10:
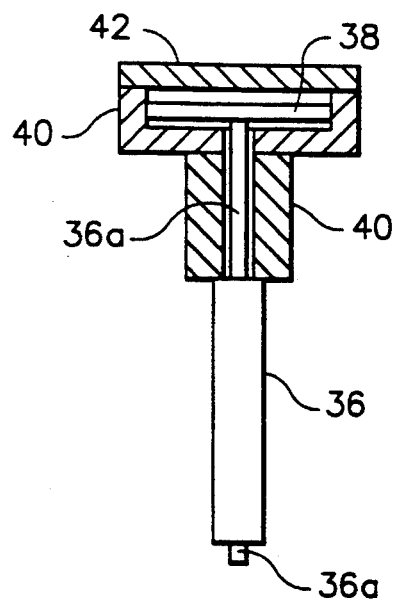
FIG. 10 is a schematic showing the ex vessel portion of the jet pump electro-nozzle in accordance with the preferred embodiment of the invention.

A novel construction of an electro-nozzle which achieves the foregoing is shown in FIGS. 9 and 10. The inner portion of the nozzle in accordance with the preferred embodiment of the invention comprises a conducting shell 2 which is electrically isolated from the main body 4 by a ceramic insulator 6. In particular, a conical portion of ceramic insulator 6 surrounds a conical portion of conducting shell 2. The insulator shell 6 is metallized over its surface and brazed to the metal shells using a high-temperature braze process known to the ceramic-to-metal joining art. The insulator material must be selected for its strength and durability in the BWR environment. Typical candidates are silica, alumina, magnesia and the like. These ceramics are very strong in compression; the joints must be designed so as to compress the insulator when raised to BWR operating temperature (i.e., $\sim 550°$ F.). This compression can be assured by judiciously selecting the inner shell material so that its coefficient of thermal expansion is greater than that of the nozzle body (typically stainless steel) and the ceramic. For example, nickel/alumina is an appropriate choice, but there are numerous other possible combinations.

An electrical feed-through 30 provides means for accessing the inner shell 2 of the nozzle electrically. The active electrical conductor 8, spot-welded to the inner shell 2, is surrounded by an insulator 32 as it passes through main body 4, feed-through 30 and a connector 34. Conductor 8 is connected, via a mineral insulated (MI) cable 36, to a circuit board 38, located outside the reactor pressure vessel. The MI cable 36 passes through the reactor pressure vessel via a conventional instrumentation penetration (not shown).

Referring to FIG. 10, the MI cable 36 contains a twisted-shielded pair of conductors 36a which connect to the circuit board via a connector 40. The passive conductor of the twisted-shielded pair 36a is connected to ground potential. The circuit board 38 is contained in a small protective housing 40 with removable cover 42 sealed by a gasket (not shown). The circuit board 38 operates off of a low-voltage DC power supply (not shown).

When energized, the current collected at the inner surface of the nozzle is controlled by the applied voltage (V) on the load resistor (R). This current (I) is converted to a voltage drop across R, which is input to a differential amplifier 44 which has a gain G. The differential amplifier output is the effective voltage "error signal" which is integrated by an operational amplifier 46 which has a time constant $\tau = R_1C$. The small stand-off resistor $R_2$ depletes excess charge build-up on the feedback capacitor (C) to eliminate any possibility of integrator malfunction.

Figure 11:
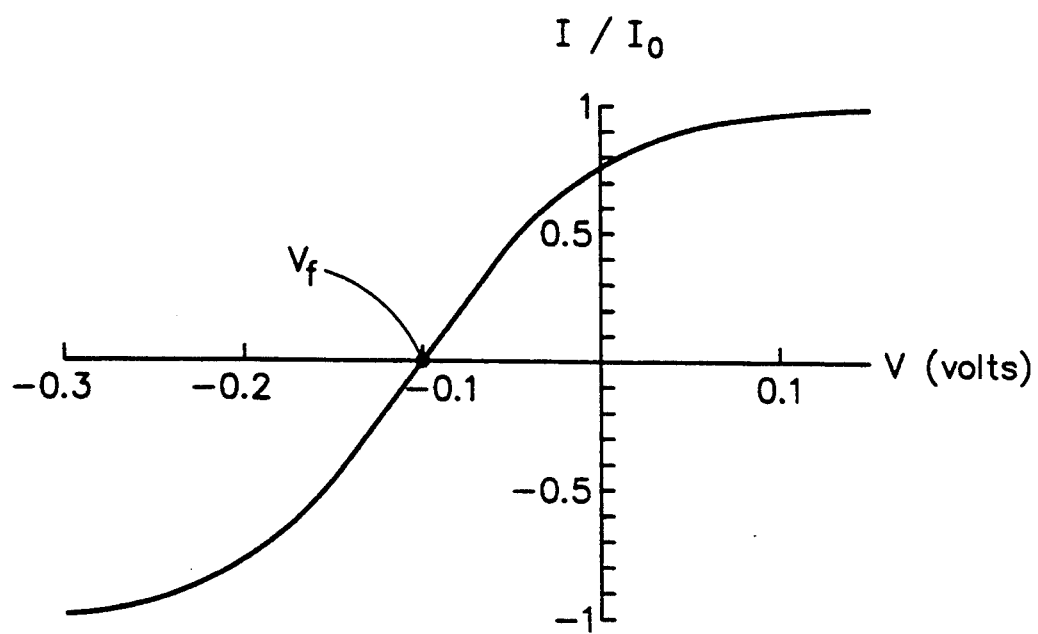
FIG. 11 is a plot of a typical current-voltage characteristic of a jet pump electro-nozzle in accordance with the present invention.

If the integrator output voltage V is positive, the current through the load resistor is driven negative. If V is negative, the current through the load resistor is driven positive. When the voltage drop is zero (i.e., the nozzle inner surface is at floating potential $V_f$), the current to the nozzle inner surface is zero, the desired operating point. A simple circuit analysis shows that the current through R decays, from a non-zero value to zero, exponentially with time. The net effect is that the collection voltage "hunts" for the zero-current condition at the surface, sliding along the curve shown in FIG. 11.

The collected current is dissipated in the load resistor R, which is sized to dissipate the small amount of energy. The gain and time constant are chosen so that the temporal behavior of the circuit averages any rapidly fluctuating changes in surface current expected in plant operations, thereby stabilizing operation.

Thus, no surface charge density can form, and no space-charge zone of either sign can exist for very long.

Electrostatically enhanced deposition is defeated by the invention. The only deposition that can occur is that due to the purely random thermal velocities of the relatively massive, multiply charged species. These thermally generated currents are sufficiently small and low energy that adherence to the surface is poor. In fact, viscous shear force at the surface is sufficient to sweep away most of the deposits. What does remain builds very much more slowly than in the case of enhanced deposition. If the particulate population changes in any way, the circuit will adjust automatically. For example, should the free-stream density $N_O$, the total particulate charge $q_)$, or the mobilities of one or the other species change, the circuit will still operate to minimize I. This is true even for multiple species with widely different properties, each contributing in differing degrees to the fluid free-stream potential.

The preferred embodiment for carrying out the method of the invention has been disclosed for the purpose of illustration only. Variations and modifications of this embodiment which incorporate the principle of operation disclosed herein will be apparent to persons skilled in the art of electrical engineering. In particular, application of the invention is not limited to jet pump nozzles in BWRs. The invention has utility in connection with any conduit, pipe or nozzle prone to electrostatically enhanced deposition of charged particulates. The invention also has application outside the nuclear reactor environment, e.g., for deposition control in petrochemical or industrial environments. All such variations and modifications are intended to fall within the scope of the claims appended hereto.

I claim:

1. A device comprising an inlet for receiving flowing liquid containing charged particles, an inner conducting surface in contact with said flowing liquid, an outlet for discharging said flowing liquid, a main body circumferentially surrounding at least a portion of said inner conducting surface, means for electrically insulating said inner conducting surface from said main body and means for electrically minimizing charged-particle deposition at said inner conducting surface.

2. The device as defined in claim 1, wherein said main body, said electrically insulating means and said inner conducting surface form a convergent nozzle.

3. The device as defined in claim 2, wherein said electrically insulating means is an electrically insulating shell comprising a conical portion, and said inner conducting surface comprises a conical portion concentric with said conical portion of said electrically insulating shell.

4. The device as defined in claim 1, wherein said means for electrically minimizing charged-particle deposition comprises:
   electrical means for dissipating a net current to said inner conducting surface, said electrical dissipating means being located outside said main body;
   a feed-through conductor for electrically connecting said inner conducting surface to said electrical dissipating means; and
   means for electrically insulating said feed-through conductor from said main body.

5. The device as defined in claim 4, wherein said electrical dissipating means comprises an amplifier having a first input electrically coupled to said feed-through conductor, a second input electrically coupled to said main body by way of a first resistor, and an output for outputting a voltage signal proportional to the difference between the voltage signals at said first and second inputs.

6. The device as defined in claim 5, wherein said electrical dissipating means further comprises a second resistor electrically coupled to said feed-through conductor, and an integrating circuit having a first input electrically coupled to said main body, a second input electrically coupled to said output of said differential amplifier, and an output connected to said feed-through conductor by way of said second resistor.

7. The device as defined in claim 2, wherein said convergent nozzle is incorporated in a jet pump assembly of a water-moderated nuclear reactor.

8. The device as defined in claim 4, wherein said electrical dissipating means comprises: a differential amplifier having first and second inputs and an output; an operational amplifier having first and second inputs and an output; first, second and third resistors; a capacitor; and first through fourth junctions,
   wherein said first junction is electrically coupled to said first input of said differential amplifier, to one side of said first resistor, and to said feed-through conductor; said second junction is electrically coupled to said first input of said operational amplifier, to one side of said second resistor, and to said main body; said third junction is electrically coupled to one side of said capacitor, to said second input of said differential amplifier, and to the other side of said second resistor; said fourth junction is electrically coupled to the other side of said capacitor, to said second input of said operational amplifier, and to one side of said third resistor; said output of said differential amplifier is electrically coupled to the other side of said third resistor; and said output of said operational amplifier is electrically coupled to the other side of said first resistor.

9. In a convergent nozzle having an inlet and an outlet, the improvement wherein said convergent nozzle comprises:
   an electrically conductive shell;
   an electrically conductive main body circumferentially surrounding at least a portion of said electrically conductive shell;
   an electrically insulating shell arranged between said electrically conductive shell and said electrically conductive main body, said electrically insulating shell being configured to electrically insulate said electrically conductive shell from said electrically conductive main body;
   a feed-through conductor for electrically connecting said electrically conductive shell to a point outside said electrically conductive main body; and
   means for electrically insulating said feed-through conductor from said main body.

10. The convergent nozzle as defined in claim 9, further comprising means for electrically minimizing charged-particle deposition at said electrically conductive shell when a liquid containing charged particles flows through said convergent nozzle.

11. The convergent nozzle as defined in claim 10, wherein said means for electrically minimizing charged-particle deposition comprises:
   electrical means for dissipating a net current to said electrically conductive shell, said electrical dissipating means being located outside said electrically conductive main body;

a feed-through conductor for electrically connecting said electrically conductive shell to said electrical dissipating means; and means for electrically insulating said feed-through conductor from said electrically conductive main body.

12. The convergent nozzle as defined in claim 11, wherein said electrical dissipating means comprises an amplifier having a first input electrically coupled to said feed-through conductor, a second input electrically coupled to said electrically conductive main body by way of a first resistor, and an output for outputting a voltage signal proportional to the difference between the voltage signals at said first and second inputs.

13. The convergent nozzle as defined in claim 9, wherein said convergent nozzle is incorporated in a jet pump assembly of a water-moderated nuclear reactor.

14. The convergent nozzle as defined in claim 10, wherein said electrical dissipating means comprises: a differential amplifier having first and second inputs and an output; an operational amplifier having first and second inputs and an output; first, second and third resistors; a capacitor; and first through fourth junctions, wherein said first junction is electrically coupled to said first input of said differential amplifier, to one side of said first resistor, and to said feed-through conductor; said second junction is electrically coupled to said first input of said operational amplifier, to one side of said second resistor, and to said main body; said third junction is electrically coupled to one side of said capacitor, to said second input of said differential amplifier, and to the other side of said second resistor; said fourth junction is electrically coupled to the other side of said capacitor, to said second input of said operational amplifier, and to one side of said third resistor; said output of said differential amplifier is electrically coupled to the other side of said third resistor; and said output of said operational amplifier is electrically coupled to the other side of said first resistor.

15. A method for minimizing electrostatically enhanced deposition of charged particles from a flowing liquid onto a surface of a channel, comprising the step of adjusting the potential of said channel surface to be equal to the potential of said flowing liquid in the vicinity of said channel surface.

16. The method as defined in claim 15, further comprising the step of electrically isolating said channel surface from the main body of said channel.

17. The method as defined in claim 16, further comprising the step of dissipating the net current to said channel surface in a resistance.

18. The method as defined in claim 14, wherein said channel is a convergent nozzle.

19. The method as defined in claim 18, further comprising the step of installing said convergent nozzle in a jet pump assembly of a water-moderated nuclear reactor.

20. The method as defined in claim 17, wherein said channel is a convergent nozzle, further comprising the steps of installing said convergent nozzle in a jet pump assembly inside a vessel of a water-moderated nuclear reactor and installing said resistance outside said vessel.

21. A fluid-conveying device having reduced susceptibility to stress corrosion cracking in a nuclear reactor environment, comprising:

a channel having an inlet, an outlet, an internal surface in contact with fluid flowing therethrough and an external surface, said channel being made of electrically conductive material;

means for electrically minimizing charged-particle deposition on said internal surface; and an electrical conductor for connecting said external surface to said means for electrically minimizing charged-particle deposition.

* * * * *